United States Patent
Hoshino et al.

(10) Patent No.: US 9,250,558 B2
(45) Date of Patent: Feb. 2, 2016

(54) LIGHT DEFLECTOR AND IMAGE FORMING APPARATUS INCLUDING A ROTATING POLYGON MIRROR HAVING DISPLACEABLE REFLECTING SURFACES

(71) Applicant: BROTHER KOGYO KABUSHIKI KAISHA, Nagoya-shi, Aichi-ken (JP)

(72) Inventors: Hidetaka Hoshino, Aichi (JP); Hitoshi Fujino, Tajimi (JP); Yoshifumi Nakamura, Ama (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/632,138

(22) Filed: Feb. 26, 2015

(65) Prior Publication Data

US 2015/0248077 A1 Sep. 3, 2015

(30) Foreign Application Priority Data

Feb. 28, 2014 (JP) ................................. 2014-039546

(51) Int. Cl.
| | |
|---|---|
| *B41J 27/00* | (2006.01) |
| *G03G 15/04* | (2006.01) |
| *G02B 26/12* | (2006.01) |

(52) U.S. Cl.
CPC .......... *G03G 15/04036* (2013.01); *G02B 26/12* (2013.01)

(58) Field of Classification Search
CPC .............. G01J 9/0246; G02B 19/0023; G02B 19/0028; G02B 26/12; G03G 15/04036
USPC ......... 347/118, 261; 359/218.1, 216; 399/216
See application file for complete search history.

(56) References Cited

U.S. PATENT DOCUMENTS

| | | | | |
|---|---|---|---|---|
| 5,239,403 | A | * | 8/1993 | Shiraishi et al. ............ 359/218.1 |
| 5,530,579 | A | | 6/1996 | Nakamura et al. |
| 8,922,606 | B2 | * | 12/2014 | Lim .............................. 347/118 |
| 2012/0050443 | A1 | | 3/2012 | Lim |

FOREIGN PATENT DOCUMENTS

| | | | |
|---|---|---|---|
| JP | S62-85566 | A | 4/1987 |
| JP | H06-202024 | A | 7/1994 |
| JP | H09-43529 | A | 2/1997 |
| JP | H0943529 | * | 2/1997 |
| JP | H11-344913 | A | 12/1999 |

* cited by examiner

*Primary Examiner* — Julian Huffman
*Assistant Examiner* — Carlos A Martinez
(74) *Attorney, Agent, or Firm* — Merchant & Gould PC

(57) ABSTRACT

In a light deflector including a polygon mirror having a plurality of reflecting surfaces; and a motor configured to rotate the polygon mirror, each of the reflecting surfaces, which has leading and trailing edges with respect to a direction of rotation of the polygon mirror and a center between the two edges, is configured to curve with the center displaced with respect to a reference straight line passing through the two edges in a plane perpendicular to an axis of rotation of the polygon mirror, radially, to a first side under a non-operating state in which the motor is not in operation, and to a second side (opposite to the first side) under a first rotating state in which progress of deformation of each of the reflecting surfaces has converged after a lapse of a first period of time from a start of rotation of the motor.

20 Claims, 4 Drawing Sheets

LIGHT DEFLECTOR AND IMAGE FORMING APPARATUS INCLUDING A ROTATING POLYGON MIRROR HAVING DISPLACEABLE REFLECTING SURFACES

CROSS-REFERENCE TO RELATED APPLICATION(S)

This application claims priority from Japanese Patent Application No. 2014-039546 filed on Feb. 28, 2014, the disclosure of which is incorporated herein by reference in its entirety.

TECHNICAL FIELD

Apparatuses disclosed herein relate to a light deflector including a polygon mirror, and an image forming apparatus including such a light deflector.

BACKGROUND ART

A polygon mirror arranged to receive a light flux emitted from a light source and configured to reflect and deflect the light flux is known in the art. Such a polygon mirror is subject to change in shape between a non-operating state and a stably-operating state which is brought about after operation for a predetermined period of time and in which the shape has been stabilized, due to centrifugal force produced by its spinning motion. Defocusing due to such change in shape may be corrected by providing a surface that is slightly recessed in the non-operating state.

In general, determination of design specifications of the light deflector is based, for convenience, on the premise that the reflecting surfaces of the polygon mirror are flat; thus, in order to obtain performance according to the required design specifications, it is preferable that the reflecting surfaces of the polygon mirror under operating conditions for deflecting a light flux be as nearly flat as possible.

SUMMARY

In one aspect, a light deflector and an image forming apparatus are disclosed herein in which reflecting surfaces of a polygon mirror are designed to be as nearly flat as possible under operating conditions for deflecting a light flux so that a desirable performance can be achieved.

According to one or more of embodiments, a light deflector is provided which comprises a polygon mirror having a plurality of reflecting surfaces; and a motor configured to rotate the polygon mirror, wherein each of the reflecting surfaces, which has leading and trailing edges with respect to a direction of rotation of the polygon mirror and a center between the two edges, is configured to curve with the center displaced with respect to a reference straight line passing through the two edges in a plane perpendicular to an axis of rotation of the polygon mirror, radially, to a first side under a non-operating state in which the motor is not in operation, and to a second side under a first rotating state in which progress of deformation of each of the reflecting surfaces has converged after a lapse of a first period of time from a start of rotation of the motor, the second side being opposite to the first side with respect to the reference straight line.

From another aspect, a light deflector according to one or more of embodiments comprises a polygon mirror having a plurality of reflecting surfaces; and a motor configured to rotate the polygon mirror, wherein given a curvature of each of the reflecting surfaces in a cross section perpendicular to an axis of rotation of the polygon mirror, the curvature being a specific curvature obtained by approximation for each of states of the polygon mirror, each of the reflecting surfaces of the polygon mirror is configured to satisfy the following condition:

$$\kappa a \times \kappa b < 0$$

where $\kappa a$ is a curvature of a reflecting surface of the polygon mirror under a non-operating state in which the motor is not in operation, and $\kappa b$ is a curvature of the reflecting surface of the polygon mirror under a first rotating state in which progress of deformation of each of the reflecting surfaces has converged after a lapse of a first period of time from a start of rotation of the motor.

In a further aspect, an image forming apparatus is provided which comprises: a light source configured to emit a light flux; a polygon mirror having a plurality of reflecting surfaces; a motor configured to rotate the polygon mirror; a photoconductor exposed to the light flux deflected by the polygon mirror; and a development member configured to supply developer onto the photoconductor, wherein each of the reflecting surfaces, which has leading and trailing edges with respect to a direction of rotation of the polygon mirror and a center between the two edges, is configured to curve with the center displaced with respect to a reference straight line passing through the two edges in a plane perpendicular to an axis of rotation of the polygon mirror, radially, to a first side under a non-operating state in which the motor is not in operation, and to a second side under a first rotating state in which progress of deformation of each of the reflecting surfaces has converged after a lapse of a first period of time from a start of rotation of the motor, the second side being opposite to the first side with respect to the reference straight line.

BRIEF DESCRIPTION OF THE DRAWINGS

The above and other aspects, their advantages and further features will become more apparent by describing in detail illustrative, non-limiting embodiments thereof with reference to the accompanying drawings, in which.

DESCRIPTION OF EMBODIMENTS

Figure 1:
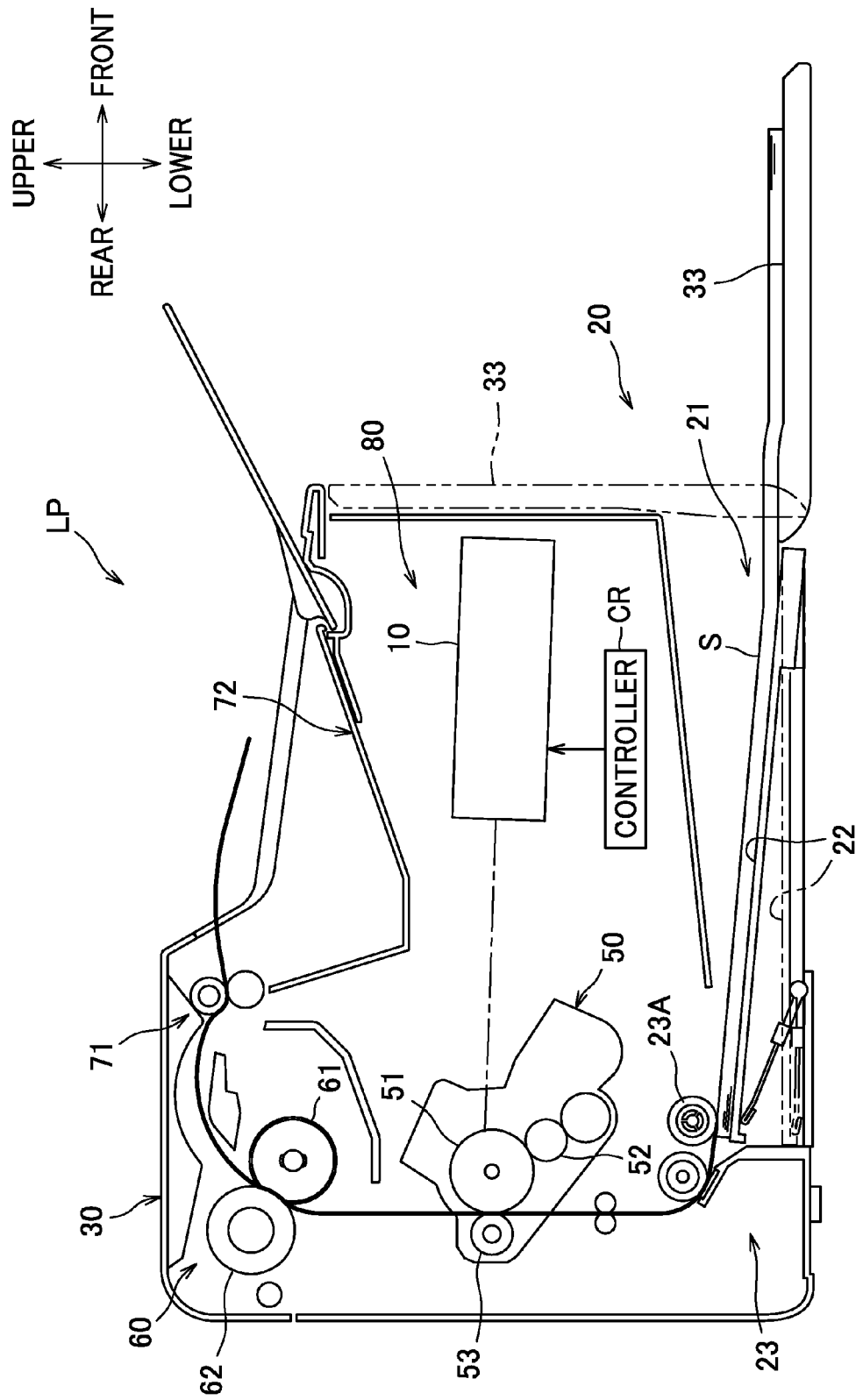
FIG. 1 is a sectional view of an image forming apparatus.

A detailed description will be given of an illustrative, non-limiting embodiment with reference made to the drawings where appropriate. As shown in FIG. 1, a laser printer LP configured as one example of an image forming apparatus comprises a body casing 30 and several components housed within the body casing 30, which principally includes a feeder unit 20 for feeding a sheet S (e.g., of paper), and an image forming unit 80 for forming an image on the sheet S fed by the feeder unit 20. The image forming unit 80 includes a scanning optical apparatus 10, a process cartridge 50 (including a development unit and a transfer unit), a fixing unit 60, and other units. In the following description, the direction is designated such that in FIG. 1, the left-hand side of the drawing sheet corresponds to the "rear" side of the printer, the right-hand side of the drawing sheet corresponds to the "front" side of the printer, the upper/lower (upward/downward or top/bottom) sides of the drawing sheet corresponds to the "upper/under or top/bottom" sides of the printer, the front side of the drawing sheet corresponds to the "left" side of the printer, and the back side of the drawing sheet corresponds to the "right" side of the printer.

The feeder unit 20 includes a sheet feed tray 21 which is made available by opening a front cover 33 of the body casing 30, a sheet pressure plate 22 provided on the sheet feed tray 21, and a sheet feed mechanism 23 which includes a sheet feed roller 23A provided at the rear side of the sheet feed tray 21. In the feeder unit 20, sheets S in the sheet feed tray 21 are pressed against the sheet feed roller 23A by the sheet pressure plate 22, and the sheet feed mechanism 23 functions wherein each sheet S is conveyed by rotation of the sheet feed roller 23A upwardly along a conveyor guide (not shown) into the image forming unit 80.

The process cartridge 50 is provided above the sheet feed tray 21 in a rear space within the body casing 30, and configured to be removable from and installable in the body casing 30. The process cartridge 50 includes a photoconductor drum 51 as one example of a photoconductor, a development roller 52 as one example of a development member, and a transfer roller 53. The photoconductor drum 51 has a peripheral surface which is positively charged by a charger (not shown) and then exposed to light by the scanning optical apparatus 10, so that an electrostatic latent image is formed on the peripheral surface of the photoconductor drum 51. The development roller 52 is a member that is configured to carry toner (developer) stored in the process cartridge 50 and to supply toner to the electrostatic latent image on the peripheral surface of the photoconductor drum 51, thereby forming a toner image thereon. The transfer roller 53 is a member that is configured to transfer the toner image from the photoconductor drum 51 onto a sheet S conveyed through between the photoconductor drum 51 and the transfer roller 53, by a transfer bias applied between the photoconductor drum 51 and the transfer roller 53.

The scanning optical apparatus 10 is disposed at the front side of the process cartridge 50, and configured to emit and sweep a laser beam over the peripheral surface of the photoconductor drum 51 in a main scanning direction, which laser beam is modulated on and off in accordance with image data, under control of a controller CR. A specific configuration of the scanning optical apparatus 10 will be described later in detail.

The fixing unit 60 includes a heating roller 61 including a heat source, and a pressure roller 62 configured to be pressed against the heating roller 61 with a sheet S pinched between the heating roller 61 and the pressure roller 62. The fixing unit 60 is disposed above the process cartridge 50, and configured to thermally fix a toner image on a sheet S fed from the process cartridge 50. An ejection roller 71 is provided at the front side of the fixing unit 60, and configured to eject a sheet S with a toner image thermally fixed thereon by the fixing unit 60, onto a sheet output tray 72 provided on a front area of an upper side of the body casing 30.

Figure 2:
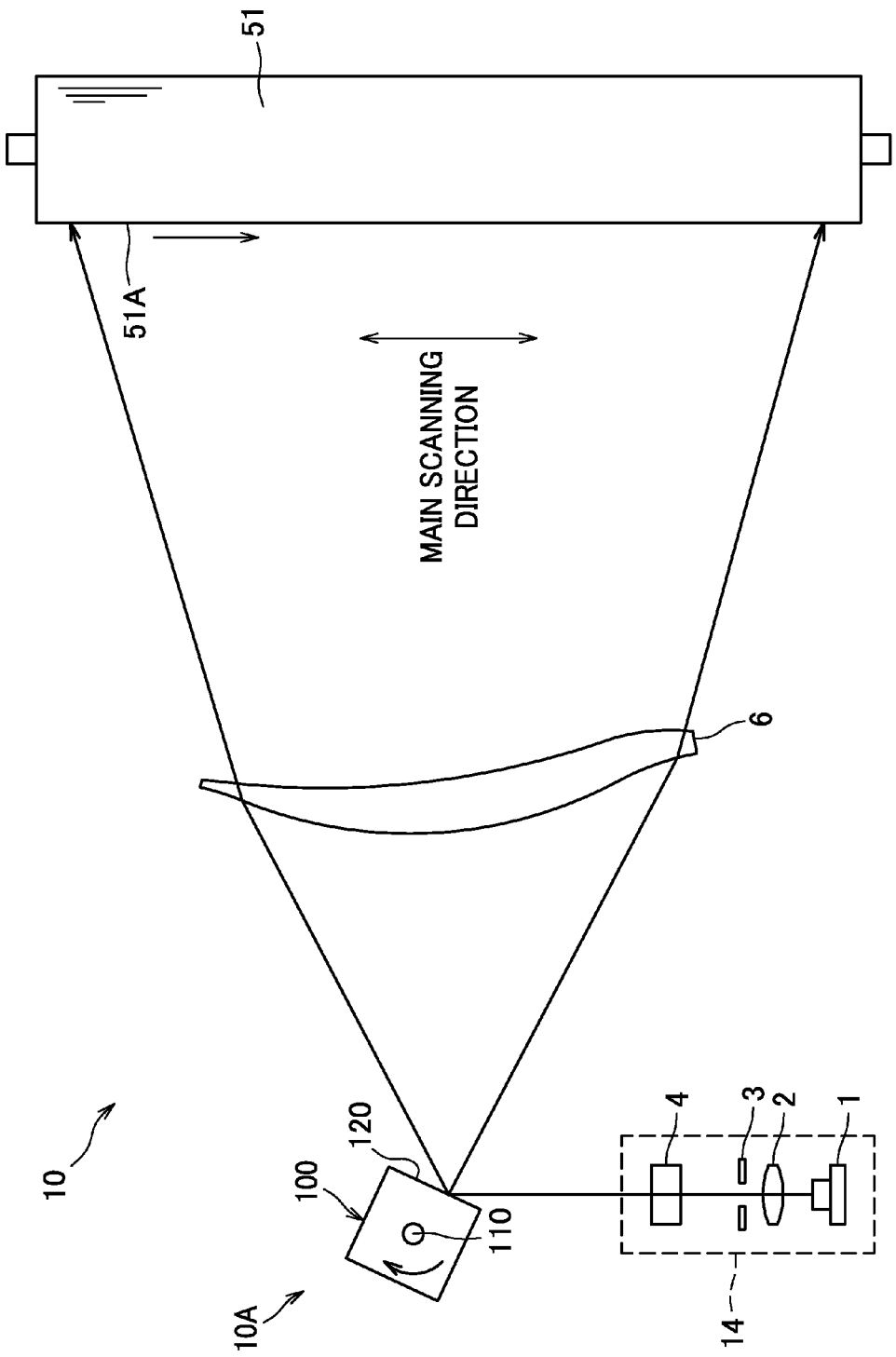
FIG. 2 is a sectional view of a scanning optical apparatus taken along a main scanning plane.

As shown in FIG. 2, the scanning optical apparatus 10 includes a light source device 14 as one example of a light source, a light deflector 10A and a single scanning lens 6. All of these components of the scanning optical apparatus 10 are arranged and configured such that a light flux (laser beam) emitted from the light source device 14 is focused on the peripheral surface (image surface 51A to be scanned) of the photoconductor drum 51 and the image surface 51A is scanned with the laser beam, so that an electrostatic latent image is formed on the image surface 51A.

The light source device 14 includes a semiconductor laser 1, a coupling lens 2, an aperture stop 3 and a cylindrical lens 4. The semiconductor laser 1 is a device configured to emit divergent laser light.

The coupling lens 2 is configured to convert the laser beam emitted from the semiconductor laser 1 into a light flux.

The aperture stop 3 is a member having an opening that determines the diameter of the light flux coming from the coupling lens 2.

The cylindrical lens 4 is configured to converge the light flux coming through the coupling lens 2 and the aperture stop 3 in a sub scanning direction (direction perpendicular to the main scanning direction) so that the light flux is focused on or near a reflecting surface 120 (each of four reflecting surfaces 120) of the polygon mirror 100 in the form of a linear image elongate in the main scanning direction.

Figure 3:
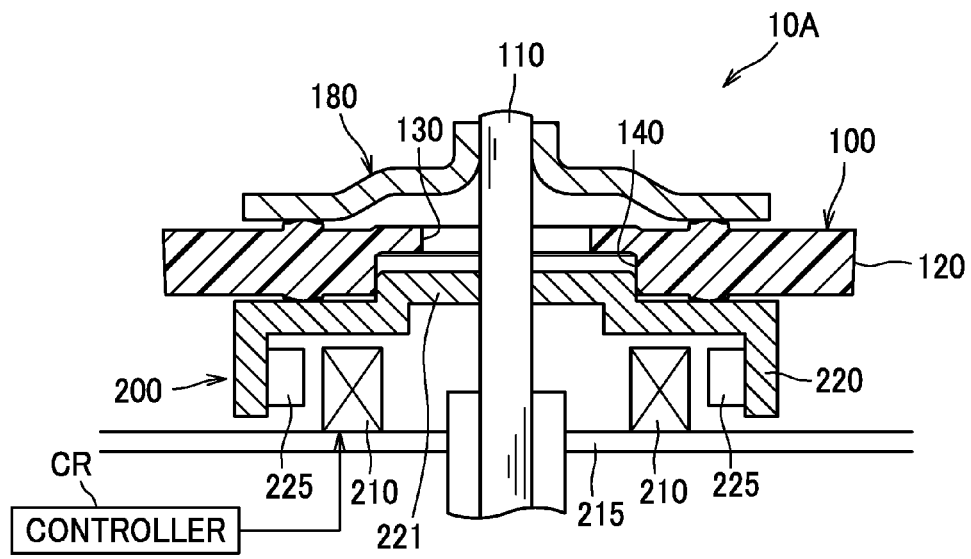
FIG. 3 is a sectional view of a portion including a motor and a polygon mirror.

As shown in FIG. 3, the light deflector 10A comprises a polygon mirror 100 and a motor 200.

The motor 200 comprises a coil 210 as a stator, and a rotor 220 configured to be rotatable relative to the stator (coil 210). The coil 210 is fixed to a base 215, and the rotor 220 is fixed to a rotary shaft 110 rotatably supported at the base 215. Magnets 225 are arranged on an inner peripheral surface of the rotor 220, and the coil 210 and the magnets 225 work together to thereby generate a driving force for causing the rotor 220 to rotate. The rotor 220 includes a protruding portion 221 that is a cylindrical protrusion having a circular cross section (not shown) and protruding in an axial direction.

The polygon mirror 100 has a plurality of reflecting surfaces 120 disposed equidistantly from an axis of rotation of the rotary shaft 110; the polygon mirror 100 shown in FIG. 2 has four reflecting surfaces 120 by way of example. The polygon mirror 100 spins at a constant rotational speed about the rotary shaft 110 and reflects and deflects a light flux having passed through the cylindrical lens 4 in the main scanning direction.

The polygon mirror 100 has a through hole 130 and a recess 140. The through hole 130 is formed at the center (or axis of rotation) of the polygon mirror 100. The recess 140 is formed around the center of rotation (around the through hole 130) of one side of the polygon mirror 100. The recess 140 is a cylindrical recess having a circular cross section (not shown). The recess 140 of the polygon mirror 100 is fitted on the protruding portion 221 of the rotor 220, so that the rotor 220 and the polygon mirror 100 are centered in alignment.

In the through hole 130 of the polygon mirror 100, the rotary shaft 110 is disposed. A leaf spring 180 is fixed at an end portion of the rotary shaft 110. The leaf spring 180 is pressed against the polygon mirror 100 so that the polygon mirror 100 is held between the leaf spring 180 and the rotor 220.

Turning back to FIG. 2, the scanning optical apparatus 10 includes only one scanning lens 6. The scanning lens 6 is configure to convert a light flux having been reflected and thus deflected by the polygon mirror 100 into a spot-like image to be focused on the image surface 51A to be scanned. The scanning lens 6 is also configured to correct an optical face tangle error of each reflecting surface 120 of the polygon mirror 100. In this way, the scanning optical apparatus 10 is configured such that each reflecting surface 120 and the image surface 51A to be scanned are conjugate to each other with respect to the sub scanning direction. The scanning lens 6 has f-theta characteristics such that a light flux deflected at a constant angular velocity by the polygon mirror 100 is converted into a light flux that scans the image surface 51A at a constant linear velocity.

Next, a specific configuration of the polygon mirror 100 will be described hereafter. The polygon mirror 100 comprises a main body made of plastic (formed by injection molding using a plastic resin material), and a reflecting film coated on the surfaces of the main body corresponding to the reflecting surfaces 120, so that the reflecting surfaces 120 are provided by evaporating an aluminum or other reflective material onto corresponding surfaces of the main body of the polygon mirror 100.

Figure 4:
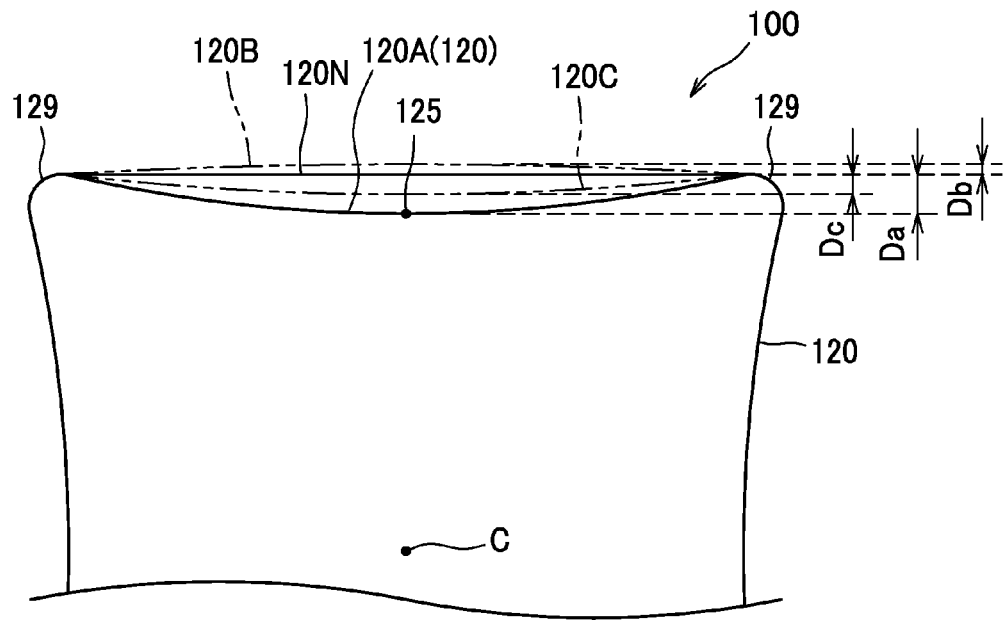
FIG. 4 is a schematic diagram for explaining deformation of a reflecting surface of the polygon mirror.

As shown in FIG. 4, each of the reflecting surfaces 120, which has leading and trailing edges with respect to a direction of rotation of the polygon mirror 100 and a center 125 between the two edges, is configured to curve with the center 125 displaced with respect to a reference straight line 120N passing through the two edges in a plane perpendicular to an axis of rotation of the polygon mirror 100, radially, to a first side under a non-operating state in which the motor 200 is not in operation. In the illustrated non-limiting embodiment, the center 125 of the reflecting surface 120 is displaced to a radially inner side (toward the center C), as represented by a non-operating-state surface 120A in FIG. 4. On the other hand, the center 125 of each reflecting surface 120 is caused to be displaced with respect to the reference straight line 120N radially to a second side (opposite to the first side) under a first rotating state in which progress of deformation of each reflecting surface has converged after a lapse of a first period of time $\Delta T1$ from a start of rotation of the motor 200. In the illustrated non-limiting embodiment, the center 125 of the reflecting surface 120 is displaced to a radially outer side (away from the center C), as represented by a first-rotating-state surface 120B in FIG. 4.

Herein, the reference straight line 120N is assumed to be a straight line segment which connects the two sides (corresponding to the leading and trailing edges) of each reflecting surface 120 and extends parallel to the direction of rotation of the polygon mirror 100, and the two sides of the reflecting surface 120 are determined by excluding rounded 129 portions (see FIG. 4) or chamfered surfaces which would be provided at the two sides of each reflecting surface 120; in other words, the reference straight line 120N is assumed to be a straight line segment which connects two ends of an effective (available) range of the reflecting surface 120 where a light flux can be deflected.

The shape of the reflecting surface 120 may be represented by a curvature in a cross section perpendicular to an axis of rotation (i.e., the axis of the rotary shaft 110) of the polygon mirror 100, as obtained by approximation for each of states of the polygon mirror 100. The reflecting surface 120 is configured to satisfy the following condition:

$\kappa a \times \kappa b < 0$ where κa is a curvature of a reflecting surface of the polygon mirror under a non-operating state in which the motor is not in operation, and κb is a curvature of the reflecting surface of the polygon mirror under a first rotating state in which progress of deformation of each of the reflecting surfaces has converged after a lapse of a first period of time from a start of rotation of the motor. In this description, the curvature of the reflecting surface 120 is assumed to be positive when the reflecting surface 120 is a bulged surface, while it is assumed to be negative when the reflecting surface 120 is a recessed surface. In this illustrative, non-limiting embodiment, the reflecting surface 120 of the polygon mirror 100 under the non-operating state is recessed and the reflecting surface 120 of the polygon mirror 100 under the first rotating state is bulged; therefore, the following condition is satisfied:

$\kappa a < 0$, and $\kappa b > 0$.

In this polygon mirror 100, a distance Da of displacement of the center 125 to the radially inner side with respect to the reference straight line 120N under the non-operating state is larger than a distance Db of displacement of the center 125 to the radially outer side with respect to the reference straight line 120N under the first rotating state.

In other words, the reflecting surface 120 of the polygon mirror 100 is configured to satisfy the following condition concerning its curvatures:

$|\kappa a| > |\kappa b|$.

In this description, the distances of displacement are assumed to be positive values.

The distance of displacement of each reflecting surface 120 of the polygon mirror 100 under the non-operating state may be determined by measuring the shape of the relevant reflecting surface 120. In order to determine the distance of displacement of each reflecting surface 120 of the polygon mirror 100 that is rotating, a laser beam for exposure to light (light scanning) is caused to enter the center 125 of the reflecting surface 120 and another laser beam (reference beam) of the same wavelength is caused to enter a flat reflector as a reference at the same time to cause these two laser beams to interfere, so that interference fringes as detected can be used to obtain the distance of displacement.

Each reflecting surface 120 of the polygon mirror 100 in this non-limiting embodiment is configured to curve with the center 125 displaced with respect to the reference straight line 120N radially to the first side (i.e., the same side as that to which displacement occurs under the non-operating state) under a second rotating state that is a state of the polygon mirror 100 at a time when the light deflector 10A has started the light scanning operation after a lapse of a second period of time $\Delta T2$ before the lapse of the first period of time $\Delta T1$, that is, the second period of time $\Delta T2$ is shorter than the first period of time $\Delta T1$ which lapses from the start of rotation of the motor 200 until progress of deformation of each reflecting surface 120 converges. In the illustrated non-limiting embodiment, the center 125 of the reflecting surface 120 is displaced to the radially inner side (toward the center C), as represented by a second-rotating-state surface 120C in FIG. 4. A distance Dc of displacement of the center 125 to the radially inner side with respect to the reference straight line 120N under the second rotating state is smaller than the distance Da of displacement of the center 125 to the radially inner side with respect to the reference straight line 120N under the non-operating state.

In other words, the reflecting surface 120 of the polygon mirror 100 in the light deflector 10A is configured to satisfy the following condition concerning its curvatures:

$\kappa a \times \kappa c > 0$; and $|\kappa a| > |\kappa c|$ where κc is a curvature of the reflecting surface 120 of the polygon mirror 100 under the second rotating state that is a state of the polygon mirror 100 at a time of the start of light scanning, and the start of light scanning is made on expiration of a second period of time $\Delta T2$ elapsing from the start of rotation of the motor 200, and the second period of time is shorter than the first period of time $\Delta T1$ which lapses from the start of rotation of the motor 200 until progress of deformation of each reflecting surface 120 converges.

The distance Dc of displacement under the second rotating state is equal to or larger than the distance Db of displacement under the first rotating state. In other words, the reflecting surface 120 of the polygon mirror 100 is configured to satisfy the following condition concerning its curvature:

$$|\kappa c| \geq |\kappa b|.$$

In order to fabricate a polygon mirror 100 having a reflecting surface 120 that satisfies one or more of the conditions as described above, measurements of its shape conducted under the non-operating state, and subsequent corrections made to the mold for use in forming the polygon mirror 100 based upon the results of the measurements so as to meet the required conditions of the distance Da of displacement and the curvature κa may suffice.

In the laser printer LP including the light deflector 10A configured as described above, the motor 200 is controlled by the controller CR to rotate at a first speed before the lapse of the second period of time ΔT2 from the start of rotation of the motor 200, and to rotate at a second speed when the light scanning proceeds after the lapse of the second period of time ΔT2, wherein the first speed is higher than the second speed. To be more specific, the controller CR is configured to cause the motor 200 to rotate at a higher first rotational speed V1 from the start of rotation of the motor 200 for a predetermined period of time shorter than the second period of time ΔT2, thereafter causes the motor 200 to rotate at a second rotational speed V2 that is lower than the first rotational speed V1 for a specific period of time, and after the rotation is stabilized (the rotational speed becomes constant), transmits a signal to the semiconductor laser 1 to cause the semiconductor laser 1 to emit a laser beam at times modulated on and off in accordance with image data, for light scanning.

An operation of the laser printer LP configured as described above will now be described in detail with a focus put on an operation of the light deflector 10A.

In the laser printer LP, during power-down (i.e., the laser printer LP is not energized) or in a sleep mode (i.e., the laser printer LP is energized but no print job is received and the scanning optical apparatus 10 needs to warm up), the motor 2 is not in operation. In this non-operating state, each reflecting surface 120 of the polygon mirror 100 is in the form of the non-operating-state surface 120A, which is recessed inwardly in a radial direction with respect to the reference straight line 120N. The non-operating-state surface 120A curves and undergoes deviation from the reference straight line 120N (with the center displaced by a distance Da of displacement with respect to the reference straight line 120N), and a curvature thereof is κa.

Figure 5:
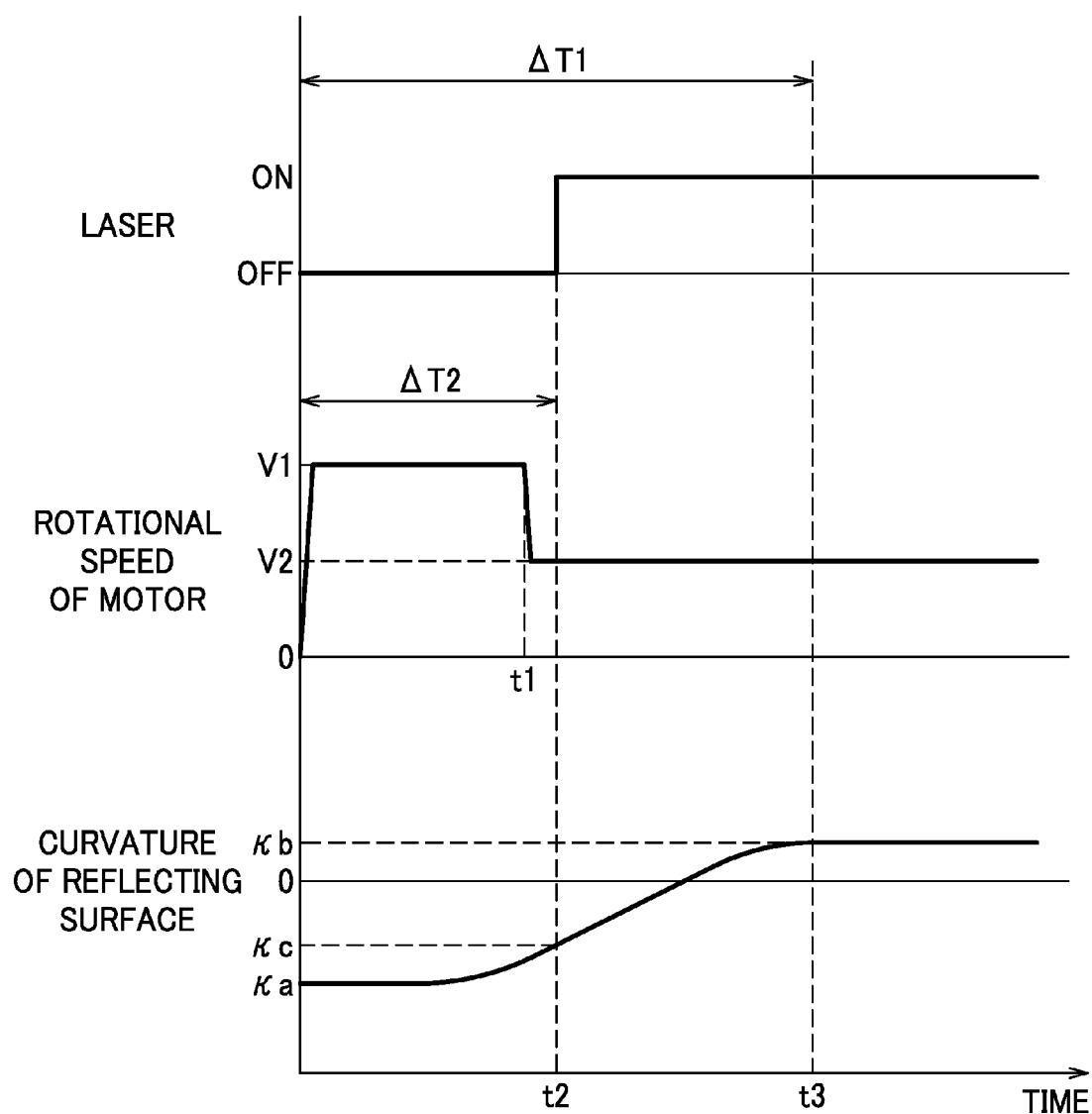
FIG. 5 is a timing chart for explaining a change of curvature of a reflecting surface effected according to operations of a motor and a semiconductor laser.

When the laser printer LP is turned on and a print job is received, the laser printer LP starts a printing operation. First of all, as shown in FIG. 5, the controller CR causes the motor 200 to rotate at a first rotational speed V1. At this stage, no signal is received by the semiconductor laser 1; that is, the laser 1 is OFF. The motor 200 is caused to rotate at the first rotational speed V1 which is higher than a second rotational speed V2 at which the motor 200 is caused to rotate during a normal operation for light scanning; therefore, the motor 200 produces greater heat, so that the polygon mirror 100 heats up quickly through the protruding portion 221 of the rotor 220 and the recess 140 of the polygon mirror 100 fitted together. Accordingly, thus-effected thermal expansion of the polygon mirror 100 and a centrifugal force applied to each reflecting surface 120 cause the reflecting surface 120 to deform and swiftly approach the reference straight line 120N.

The controller CR reduces the rotational speed of the motor 200 from V1 to V2 at a time t1 until which a predetermined period of time elapses from the start of rotation of the motor 200. Thereafter, when the rotational speed of the motor 200 becomes stable at a time t2, a signal is inputted in the semiconductor laser 1; that is, the laser 1 is turned ON, and thus the light deflector 10A starts the operation for light scanning. In this way, the optical scanning apparatus 10 starts illumination to expose the photoconductor drum 51 to light. It is to be understood that frequent intervals of ON/OFF modulation in accordance with image data is not shown in FIG. 5. In this second rotating state, each reflecting surface 120 of the polygon mirror 100 is in the form of the second-rotating-state surface 120C, which is recessed inwardly in a radial direction with respect to the reference straight line 120N. The second-rotating-state surface 120C curves and undergoes deviation from the reference straight line 120N (with the center displaced by a distance Dc of displacement, which is smaller than the distance Da of displacement, with respect to the reference straight line 120N), and a curvature thereof is κc that is greater than κa (NB: an absolute value of κc is smaller than an absolute value of κa).

The controller CR causes the motor 200 to rotate at the rotational speed V2 while providing a signal to the semiconductor laser 1 to continue illumination to expose the photoconductor drum 51 to light, and at a time t3 until which a first period of time ΔT1 elapses from a start of rotation of the motor 200, the progress of deformation of each reflecting surface 120 converges and the shape of the reflecting surface 120 becomes stable. In this first rotating state, each reflecting surface 120 of the polygon mirror 100 is in the form of the first-rotating-state surface 120B, which is bulged outwardly in the radial direction with respect to the reference straight line 120N. The first-rotating-state surface 120B curves and undergoes deviation from the reference straight line 120N (with the center displaced by a distance Db of displacement, which is smaller than the distance Dc of displacement, with respect to the reference straight line 120N), and an absolute value |κb| of a curvature κb thereof is smaller than the absolute value |κc| of the curvature κc of the reflecting surface 120 of the polygon mirror 100 under the second rotating state. In other words, each reflecting surface 120 becomes flatter (i.e., closer to a plane) at a time when the shape of the reflecting surface 120 becomes stable than at the time of the start of light scanning, so that the convergence or divergence of a light flux at each reflecting surface 120 is reduced. Therefore, change in the position of focus at the image surface 51A to be scanned can be reduced, and an improved optical characteristic can be achieved.

As described above, in the laser printer LP configured according to the illustrated non-limiting embodiment, each reflecting surface 120 changes its position with respect to the reference straight line 120N from the first side to the second side in the radial direction while the polygon mirror 100 is shifting from the non-operating state to the first rotating state; in other words, the reflecting surface 120 of the polygon mirror 100 under the non-operating state and under the first rotating state are configured to have different shapes curved reversely and positioned in two sides (i.e., the first side and the second side, respectively) across the plane, and thus the reflecting surface 120 can be shaped to be flatter (i.e., closer to a plane) when the light deflector 10A is in operation for deflecting a light flux after progress of deformation of each of the reflecting surfaces 120 has converged, so that the light deflector 10A can achieve a desirable performance. Consequently, change in the diameters of beam spots formed on the photoconductor drum 51 can be restricted, and the image quality of the laser printer LP can thus be stabilized.

Moreover, in the laser printer LP configured according to the illustrated non-limiting embodiment, each reflecting surface 120 has a shape flatter (closer to a plane) when the polygon mirror 100 is under the first rotating state than when the polygon mirror 100 is under the non-operating state, and thus the performance of the light deflector 10A during the operation of deflecting a light flux can be improved. Since the distance Dc of displacement under the second rotating state is smaller than the distance Da of displacement under the non-operating state, the light scanning can be started earlier prior to the time at which the polygon mirror 100 enters the first rotating state. Furthermore, in this laser Printer LP, the distance Dc of displacement under the second rotating state is larger than the distance Db of displacement under the first rotating state ($|\kappa c| \geq |\kappa b|$), and each reflecting surface 120 thus has a shape flatter (closer to a plane) when the polygon mirror 100 is under the first rotating state, so that the performance of the light deflector 10A during the operation of deflecting a light flux can be improved.

Since the recess 140 of the polygon mirror 100 is fitted on the protruding portion 221 of the rotor 220, the polygon mirror 100 is subject to deformation due to thermal expansion caused by heat generated in the motor 200 and transmitted through the rotor 220. Moreover, the polygon mirror 100 is made of plastic (i.e., its main body consists essentially of a molded plastic resin material), and thus deformable by centrifugal force or thermal expansion. Therefore, it is preferable that the positions of the center 125 of each reflecting surface 120 under the non-operating state and the first rotating state of the polygon mirror 100 are on the opposite sides with respect to the reference straight line 120N as in the illustrated non-limiting embodiment so that the shape of the reflecting surface 120 of the polygon mirror in operation for deflecting a light flux is rendered flatter (closer to a plane).

Also in the laser printer LP configured according to the illustrated non-limiting embodiment, before the lapse of the second period of time ΔT2 from the start of rotation of the motor 200, the motor 200 rotates at the first rotational speed V1 higher than the second rotational speed V2 at which the motor 200 is caused to rotate during the operation for light scanning after the lapse of the second period of time ΔT2 from the start of rotation of the motor 200. Accordingly, the heat produced in the motor 200 is supplied swiftly to the polygon mirror 100, and the polygon mirror 100 approaches the first rotating state quickly, with the result that the second period of time ΔT2 can be shortened and the operation of light scanning can be started quickly.

It is to be understood that the number of surfaces of the polygon mirror is not limited to four, but may be five, six or more.

The illustrated configuration of the polygon mirror 100 is such that each reflecting surface 120 has a shape recessed under the non-operating state of the polygon mirror 100 and bulged under the first rotating state with respect to the reference straight line 120N, but an alternative configuration practicable may be vice versa; namely, the characteristic of change in the shape of the reflecting surface 120 with increase in temperature may be different depending on the size of the hole provided in the polygon mirror 100 or other factors. Specifically, depending on the thermal deformation characteristic of the polygon mirror 100, each reflecting surface 120 may have a shape bulged under the non-operating state of the polygon mirror 100 ($\kappa a > 0$) and recessed under the first rotating state ($\kappa b < 0$) with respect to the reference straight line 120N. In this alternative configuration as well, it may be preferable that the distances of displacement are adjusted to satisfy: Da>Db, and it may be preferable that the magnitudes (absolute values) of curvature are adjusted to satisfy: $|\kappa a| \geq |\kappa b|$. Furthermore, under the second rotating state, it may be preferable that the reflecting surface 120 is a bulged surface, it may be preferable that the distance Dc of displacement is equal to or larger than the distance Db of displacement, and it may be preferable that $|\kappa c| \geq |\kappa b|$.

The illustrated configuration of the polygon mirror 100 is such that the center 120 of each reflecting surface 120 is displaced to a first side under the first rotating state, and to a second side opposite to the first side under the second rotating state with respect to the reference straight line 120N; however, the first side and the second side may be the same side.

In the above description, a laser printer is illustrated as an example of an image forming apparatus, but a copier or a multifunction peripheral may be configured as described herein. Furthermore, an apparatus having a multicolor image forming capability may be adopted instead of the apparatus having a monochrome image forming capability as illustrated above.

In the above description, a light deflector is adopted in a scanning optical apparatus for use in an image forming apparatus, but may also be adopted in an image projector or the like.

What is claimed is:

1. A light deflector comprising:
a polygon mirror having a plurality of reflecting surfaces; and
a motor configured to rotate the polygon mirror,
wherein each of the reflecting surfaces, which has leading and trailing edges with respect to a direction of rotation of the polygon mirror and a center between the two edges, is configured to curve with the center displaced with respect to a reference straight line passing through the two edges in a plane perpendicular to an axis of rotation of the polygon mirror, radially, to a first side under a non-operating state in which the motor is not in operation, and to a second side under a first rotating state in which progress of deformation of each of the reflecting surfaces has converged after a lapse of a first period of time from a start of rotation of the motor, the second side being opposite to the first side with respect to the reference straight line,
wherein each of the reflecting surfaces is further configured to curve with the center displaced with respect to the reference straight line radially to the first side under a second rotating state that is a state of the polygon mirror at a time of a start of light scanning, the start of light scanning being made on expiration of a second period of time elapsing from the start of rotation of the motor, the second period of time being shorter than the first period of time, and
wherein a distance of displacement of the center to the first side with respect to the reference straight line under the second rotating state is smaller than the distance of displacement of the center to the first side with respect to the reference straight line under the non-operating state.

2. The light deflector according to claim 1, wherein a distance of displacement of the center to the first side with respect to the reference straight line under the non-operating state is larger than a distance of displacement of the center to the second side with respect to the reference straight line under the first rotating state.

3. The light deflector according to claim 1, wherein the distance of displacement of the center to the first side with respect to the reference straight line under the second rotating state is equal to or larger than the distance of displacement of the center to the second side with respect to the reference straight line under the first rotating state.

4. The light deflector according to claim 1, wherein the first side is a radially inner side closer to the axis of rotation of the polygon mirror with respect to the reference straight line, and the second side is a radially outer side away from the axis of rotation of the polygon mirror with respect to the reference straight line.

5. The light deflector according to claim 1, wherein the polygon mirror has a recess provided at a center of rotation thereof, and the motor includes a rotor fitted in the recess of the polygon mirror.

6. The light deflector according to claim 1, wherein the motor is configured to rotate at a first speed before the lapse of the second period of time from the start of rotation of the motor, and to rotate at a second speed when the light scanning proceeds after the lapse of the second period of time, the first speed being higher than the second speed.

7. The light deflector according to claim 1, wherein the polygon mirror comprises a main body made of plastic.

8. A light deflector comprising:
a polygon mirror having a plurality of reflecting surfaces; and
a motor configured to rotate the polygon mirror,
wherein given a curvature of each of the reflecting surfaces in a cross section perpendicular to an axis of rotation of the polygon mirror, the curvature being a specific curvature obtained by approximation for each of states of the polygon mirror, each of the reflecting surfaces of the polygon mirror is configured to satisfy the following condition:

$$\kappa a \times \kappa b < 0$$

where $\kappa a$ is a curvature of a reflecting surface of the polygon mirror under a non-operating state in which the motor is not in operation, and $\kappa b$ is a curvature of the reflecting surface of the polygon mirror under a first rotating state in which progress of deformation of each of the reflecting surfaces has converged after a lapse of a first period of time from a start of rotation of the motor,
wherein each of the reflecting surfaces of the polygon mirror is further configured to satisfy the following conditions:

$$\kappa a \times \kappa c > 0; \text{ and}$$

$$|\kappa a| > |\kappa c|$$

where $\kappa c$ is a curvature of a reflecting surface of the polygon mirror under a second rotating state that is a state of the polygon mirror at a time of a start of light scanning, the start of light scanning being made on expiration of a second period of time elapsing from the start of rotation of the motor, the second period of time being shorter than the first period of time.

9. The light deflector according to claim 8, wherein each of the reflecting surfaces of the polygon mirror is further configured to satisfy the following condition:

$$|\kappa a| > |\kappa b|.$$

10. The light deflector according to claim 8, wherein each of the reflecting surfaces of the polygon mirror is further configured to satisfy the following condition:

$$|\kappa c| \geq |\kappa b|.$$

11. The light deflector according to claim 8, wherein each of the reflecting surfaces of the polygon mirror is further configured to satisfy the following condition:

$$\kappa a < 0, \text{ and } \kappa b > 0$$

where a curvature of a bulged reflecting surface is assumed to be positive, and a curvature of a recessed reflecting surface is assumed to be negative.

12. The light deflector according to claim 8, wherein the polygon mirror has a recess provided at a center of rotation thereof, and the motor includes a rotor fitted in the recess of the polygon mirror.

13. The light deflector according to claim 8, wherein the motor is configured to rotate at a first speed before the lapse of the second period of time from the start of rotation of the motor, and to rotate at a second speed when the light scanning proceeds after the lapse of the second period of time, the first speed being higher than the second speed.

14. The light deflector according to claim 8, wherein the polygon mirror comprises a main body made of plastic.

15. An image forming apparatus comprising:
a light source configured to emit a light flux;
a polygon mirror having a plurality of reflecting surfaces;
a motor configured to rotate the polygon mirror;
a photoconductor exposed to the light flux deflected by the polygon mirror; and
a development member configured to supply developer onto the photoconductor,
wherein each of the reflecting surfaces, which has leading and trailing edges with respect to a direction of rotation of the polygon mirror and a center between the two edges, is configured to curve with the center displaced with respect to a reference straight line passing through the two edges in a plane perpendicular to an axis of rotation of the polygon mirror, radially, to a first side under a non-operating state in which the motor is not in operation, and to a second side under a first rotating state in which progress of deformation of each of the reflecting surfaces has converged after a lapse of a first period of time from a start of rotation of the motor, the second side being opposite to the first side with respect to the reference straight line,
wherein each of the reflecting surfaces is further configured to curve with the center displaced with respect to the reference straight line radially to the first side under a second rotating state that is a state of the polygon mirror at a time of a start of light scanning, the start of light scanning being made on expiration of a second period of time elapsing from the start of rotation of the motor, the second period of time being shorter than the first period of time, and
wherein a distance of displacement of the center to the first side with respect to the reference straight line under the second rotating state is smaller than the distance of displacement of the center to the first side with respect to the reference straight line under the non-operating state.

16. The image forming apparatus according to claim 15, wherein a distance of displacement of the center to the first side with respect to the reference straight line under the non-operating state is larger than a distance of displacement of the center to the second side with respect to the reference straight line under the first rotating state.

17. The image forming apparatus according to claim 15, wherein the distance of displacement of the center to the first side with respect to the reference straight line under the second rotating state is equal to or larger than the distance of displacement of the center to the second side with respect to the reference straight line under the first rotating state.

18. The image forming apparatus according to claim 15, wherein the first side is a radially inner side closer to the axis of rotation of the polygon mirror with respect to the reference straight line, and the second side is a radially outer side away from the axis of rotation of the polygon mirror with respect to the reference straight line.

19. The image forming apparatus according to claim 15, wherein the motor is configured to rotate at a first speed before the lapse of the second period of time from the start of rotation of the motor, and to rotate at a second speed when the light scanning proceeds after the lapse of the second period of time, the first speed being higher than the second speed.

20. The image forming apparatus according to claim 15, wherein the polygon mirror comprises a main body made of plastic.

* * * * *